United States Patent Office 3,052,685
Patented Sept. 4, 1962

3,052,685
DIPHENYL 4-PIPERIDYL CARBINOL AND ITS
ACID-ADDITION SALTS
Arthur Walter Weston, Lake Bluff, Ill., assignor to Abbott Laboratories, North Chicago, Ill., a corporation of Illinois
No Drawing. Filed Dec. 5, 1961, Ser. No. 157,243
3 Claims. (Cl. 260—294.7)

This invention relates to the novel compound diphenyl 4-piperidyl carbinol of the formula

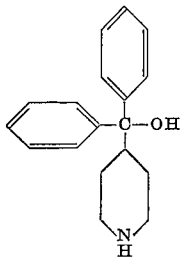

and its non-toxic, acid-addition salts. These compounds are useful as antispasmodics and antihistaminics. The base is also a central nervous system depressant as contrasted to diphenyl 2-piperidyl carbinol claimed in U.S. 2,624,739 which is a central nervous system stimulant.

The base is usually more soluble in water in the form of one of its acid-addition salts such as the sulfate, phosphate, hydrochloride, levulenate, acetate or tartrate. In a representative operation, an intravenous injection of one ml. of an isotonic, aqueous saline solution containing one mg. of diphenyl 4-piperidyl carbinol into cats produced a 30% inhibition of histamine.

The following example illustrates the preparation of the compounds claimed.

Example 1

A mixture of 13.05 grams (0.05 mole) of diphenyl 4-pyridyl carbinol prepared as described in Berichte 61,547 (1928), 200 ml. of glacial acetic acid and 0.2 gram of platinum oxide was hydrogenated under 35 lbs. per square inch of hydrogen pressure for 18 hours. The mixture was then filtered to remove insoluble material and catalyst. Water was added to the filtrate and the aqueous solution was filtered and neutralized with sodium bicarbonate to precipitate the desired diphenyl 4-piperidyl carbinol product as a white solid which melted at 160° C. after recrystallization from a benzene-petroleum ether mixture. Anal. calc'd. for $C_{18}H_{21}NO$: C=80.86%; H=7.92%. Found: C=80.69%; H=7.94%.

The hydrochloride salt is readily prepared by dissolving the above base in dry ether and adding ethereal hydrochloride solution thereto until the solid HCl salt precipitates which is then recrystallized from an alcohol-ether mixture.

This application is a continuation-in-part of my copending application Serial No. 723,125, filed March 24, 1958, now abandoned, which in turn was a continuation-in-part of Serial No. 516,773, filed June 20, 1955, and now abandoned, which in turn was a divisional application of Serial No. 284,656, filed April 26, 1952, and now abandoned.

I claim:
1. A compound selected from the group consisting of diphenyl 4-piperidyl carbinol and its non-toxic, acid-addition salts.
2. The hydrochloride salt of diphneyl 4-piperidyl carbinol.
3. Diphenyl 4-piperidyl carbinol.

References Cited in the file of this patent
UNITED STATES PATENTS
2,624,739    Werner et al. _____ Jan. 6, 1953